US006859208B1

(12) United States Patent
White

(10) Patent No.: US 6,859,208 B1
(45) Date of Patent: Feb. 22, 2005

(54) SHARED TRANSLATION ADDRESS CACHING

(75) Inventor: Bryan R. White, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 363 days.

(21) Appl. No.: 09/676,844

(22) Filed: Sep. 29, 2000

(51) Int. Cl.$^7$ .................................................. G09G 5/36
(52) U.S. Cl. ...................... 345/557; 345/542; 711/113; 711/118
(58) Field of Search ................................ 345/557, 542, 345/530, 531, 532, 519, 520, 502–506; 711/3, 113, 118, 129, 130, 131, 132, 140, 153, 173, 220, 221

(56) References Cited

U.S. PATENT DOCUMENTS

| | | | |
|---|---|---|---|
| 5,793,996 A | | 8/1998 | Childers et al. |
| 5,941,968 A | | 8/1999 | Mergard et al. |
| 6,069,638 A | | 5/2000 | Porterfield |
| 6,097,402 A | | 8/2000 | Case et al. |
| 6,104,417 A | * | 8/2000 | Nielsen et al. ............... 345/542 |
| 6,148,357 A | | 11/2000 | Gulick et al. |
| 6,208,273 B1 | | 3/2001 | Dye et al. |
| 6,275,240 B1 | | 8/2001 | Riffault |
| 6,304,244 B1 | | 10/2001 | Hawkins et al. |
| 6,374,317 B1 | * | 4/2002 | Ajanovic et al. ............ 710/105 |
| 6,477,623 B2 | | 11/2002 | Jeddeloh |
| 6,480,198 B2 | * | 11/2002 | Kang .......................... 345/519 |
| 6,480,200 B1 | * | 11/2002 | Fisher et al. ................. 345/582 |
| 6,496,193 B1 | * | 12/2002 | Surti et al. ................... 345/552 |
| 6,513,099 B1 | * | 1/2003 | Smith et al. ................. 711/118 |
| 6,532,019 B1 | | 3/2003 | Gulick et al. |
| 6,591,347 B2 | * | 7/2003 | Tischler et al. .............. 711/134 |
| 6,667,745 B1 | * | 12/2003 | Hussain ....................... 345/545 |
| 6,714,957 B1 | * | 3/2004 | Lohman ....................... 708/498 |

FOREIGN PATENT DOCUMENTS

| | | |
|---|---|---|
| EP | 0326275 | 1/1989 |
| EP | 0 766 177 | 4/1997 |
| EP | 0 902 355 | 3/1999 |
| TW | 436694 | 5/2001 |
| WO | WO 99/28893 | 6/1999 |
| WO | WO 99/34293 | 7/1999 |
| WO | WO 00/29934 | 5/2000 |

OTHER PUBLICATIONS

VIA Technologies, Inc. Manual, VIA ProSavageTM PM133, http://www.via.com.tw/products/prodpm133.htm; Jan. 19, 2001.

VIA Technologies, Inc. Manual, VIA ProSavageTM PM601, http://www.via.com.tw/products/prodpm601.htm; Jan. 19, 2001.

VIA Technologies, Inc. Manual, Via Apollo MVP4, http://www.via.com.tw/products/prodpm601.htm; Jan. 19, 2001.

U.S. Appl. No. 09/595,509 Office Action mailed Jan. 31, 2003.

U.S. Appl. No. 09/595,509 Office Action mailed Jul. 10, 2003.

U.S. Appl. No. 09/644,967 Office Action mailed Jan. 24, 2003.

U.S. Appl. No. 09/644,967 Office Action mailed Jun. 6, 2003.

U.S. Appl. No. 09/644,967, Notice of Allowance mailed Oct. 1, 2003.

* cited by examiner

Primary Examiner—Matthew C. Bella
Assistant Examiner—Mackly Monestime
(74) Attorney, Agent, or Firm—Fish & Richardson P.C.

(57) ABSTRACT

A memory controller hub includes a graphics subsystem adapted to perform graphics operations on data and a cache adapted to store of locations in physical memory available to the graphics subsystem for storing graphics data and available to a graphics controller coupled to the memory controller hub to store graphics data.

16 Claims, 3 Drawing Sheets

SHARED TRANSLATION ADDRESS CACHING

BACKGROUND

The invention relates to caching in memory controller hubs.

Microcomputer systems generally include one or more memory controller hubs that control and coordinate the transfer of data between the computer's system memory, central processing unit (CPU), and peripheral devices. Graphics applications may be supported by peripheral devices known as graphics controllers that require a memory controller hub to transfer data between the graphics controller, the system memory, and the CPU.

A design concern associated with microcomputer systems is the quality of two-dimensional (2D), three-dimensional (3D), and video image (collectively referred to below as "graphics") processing. High-performance graphics processing requires processor-intensive calculations and the fast manipulation of large quantities of data. Several designs have been implemented to achieve high-performance graphics processing while also reducing the cost of the complete system and allowing for upgrades to the computer system's capability.

A computer system may include a graphics controller coupled to local memory for storing graphics data, so that the amount of data that must be transferred between the graphics controller and the system memory and/or the CPU is reduced. Increasing the amount of local memory available to the graphics controller improves graphics performance, but also increases the cost of the computer system, because local graphics memory is relatively expensive. Less local memory is required to achieve the same graphics performance, however, if a dedicated bus, e.g., an Accelerated Graphics Port (AGP), is used to couple the controller to the memory controller hub. An AGP allows the controller to treat portions of system memory as dedicated local graphics memory, which reduces the amount of local memory required and lowers overall system costs.

Computer system costs also may be reduced by eliminating the peripheral graphics controller and integrating its functionality into the memory controller hub. In such a configuration the memory controller hub is better described as a graphics/memory controller hub, since it performs graphics processing functions in addition to memory control and transfer functions. Additionally, it includes one or more output ports to send graphics signals to external devices, such as cathode ray tubes (CRTs) and flat-panel monitors. A graphics/memory controller hub may be coupled to local memory for storing graphics data.

DETAILED DESCRIPTION

In a computer system, a memory controller hub may be integrated with an internal graphics controller and may interface with an external graphics device through an AGP port. Because the memory controller hub controls both graphics and memory functions it is referred to as a graphics/memory controller hub (GMCH). The GMCH provides both internal graphics processing and scalable graphics performance through an AGP interface.

The GMCH may be used in one of two mutually exclusive modes: AGP mode, in which case the GMCH uses its capability to interface with an external graphics controller and its internal graphics functionality is disabled; or Gfx mode, in which case the GMCH uses its internal graphics capability, and its ability to interface with an external graphics controller is disabled. In Gfx mode the GMCH can still interface with a local memory module through the AGP port to provide additional graphics memory for use by the internal graphics. Whether the GMCH operates in AGP mode or Gfx mode can be determined automatically and set during the start-up sequence of the computer.

Figure 1:
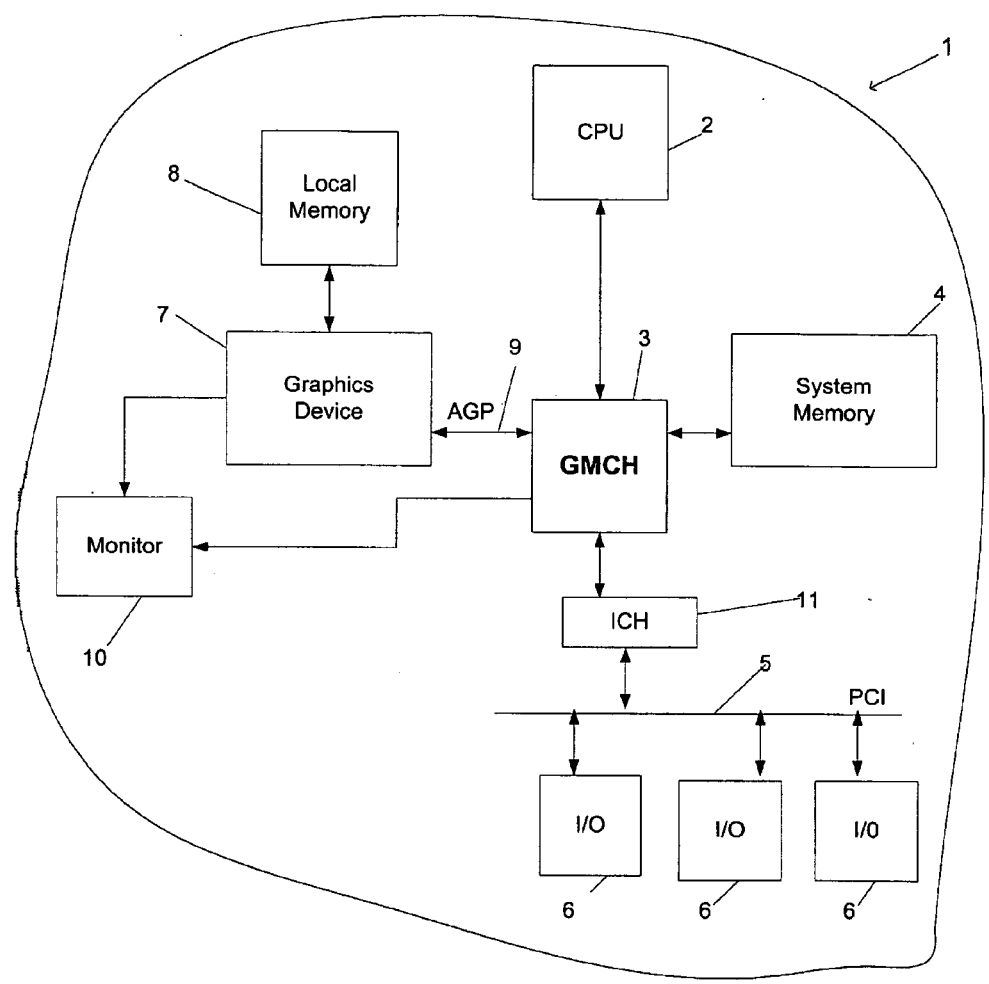
FIG. 1 is a schematic block diagram of a computer system.

FIG. 1 illustrates an exemplary computer system 1 in which the GMCH can be implemented. The computer system 1 includes a microprocessor (for example, CPU) 2 coupled to a GMCH 3, which contains a system memory controller hub. GMCH 3 may also be referred to as a "chipset" or "core logic." GMCH 3 provides an interface between CPU 2 and system memory 4, and between CPU 2 and a bus, for example, a peripheral component interconnect (PCI) or Hublink™ bus 5. Various input/output (I/O) devices 6 are coupled to PCI bus 5, which is coupled to GMCH 3 via input/output controller hub (ICH) 11. Computer system 1 may also include a graphics device 7, which may be a graphics controller coupled to local memory 8, or which may be an AGP Inline Memory Module (AIMM) that provides external local memory for the internal graphics functionality of GMCH 3. A shared AGP/local memory interface 9 provides a dedicated interface bus between GMCH 3 and graphics device 7. Graphics and video signals may be sent to a display device 10 from graphics device 7 if one is present in the computer system, or may be sent to display device 10 from GMCH 3 if graphics device 7 is absent.

Figure 2:
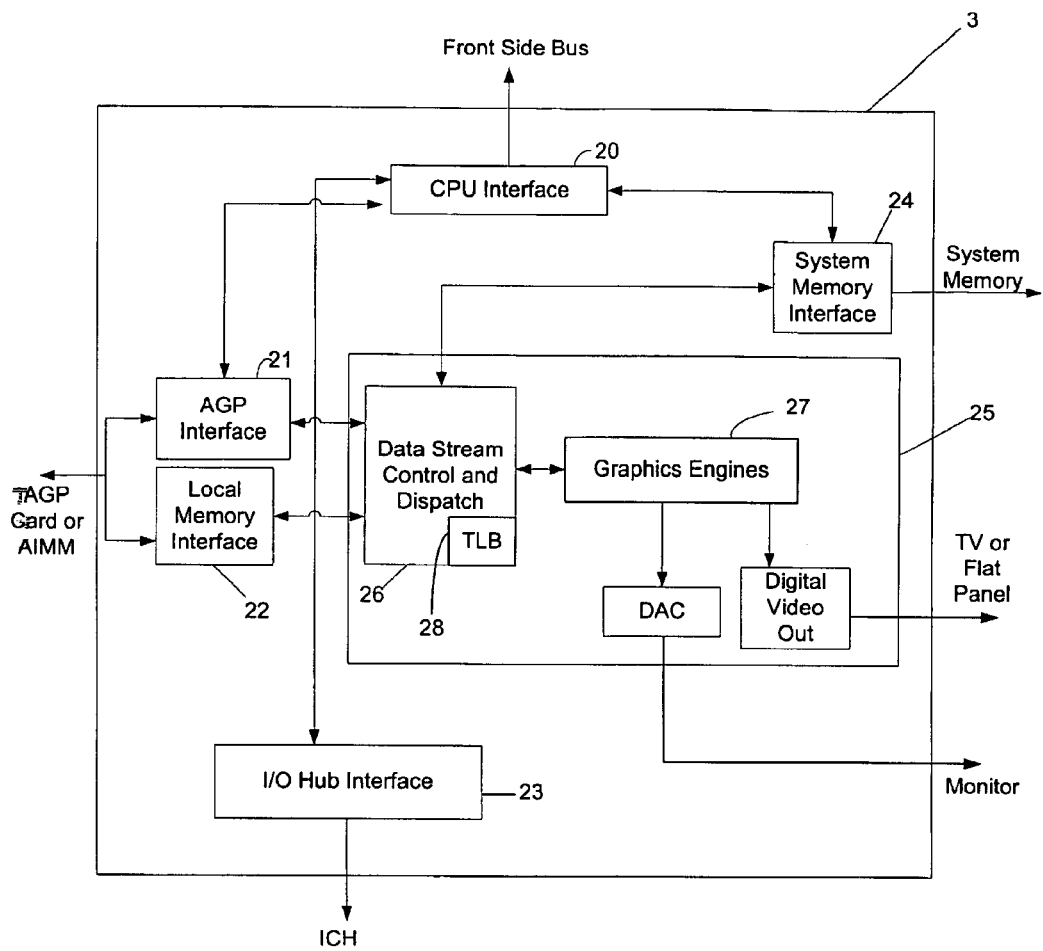
FIG. 2 is a schematic block diagram of a graphics memory controller hub.

FIG. 2 illustrates other details of GMCH 3, including a CPU interface 20 coupled to an AGP interface 21, a local memory interface 22, an input/output (I/O) hub interface 23, and a system memory interface 24. Graphics functions can be performed by internal graphics components 25, which include a data stream and dispatch controller 26 to manage the flow of data and various graphics engines 27 to perform graphics operations on data.

Figure 3:
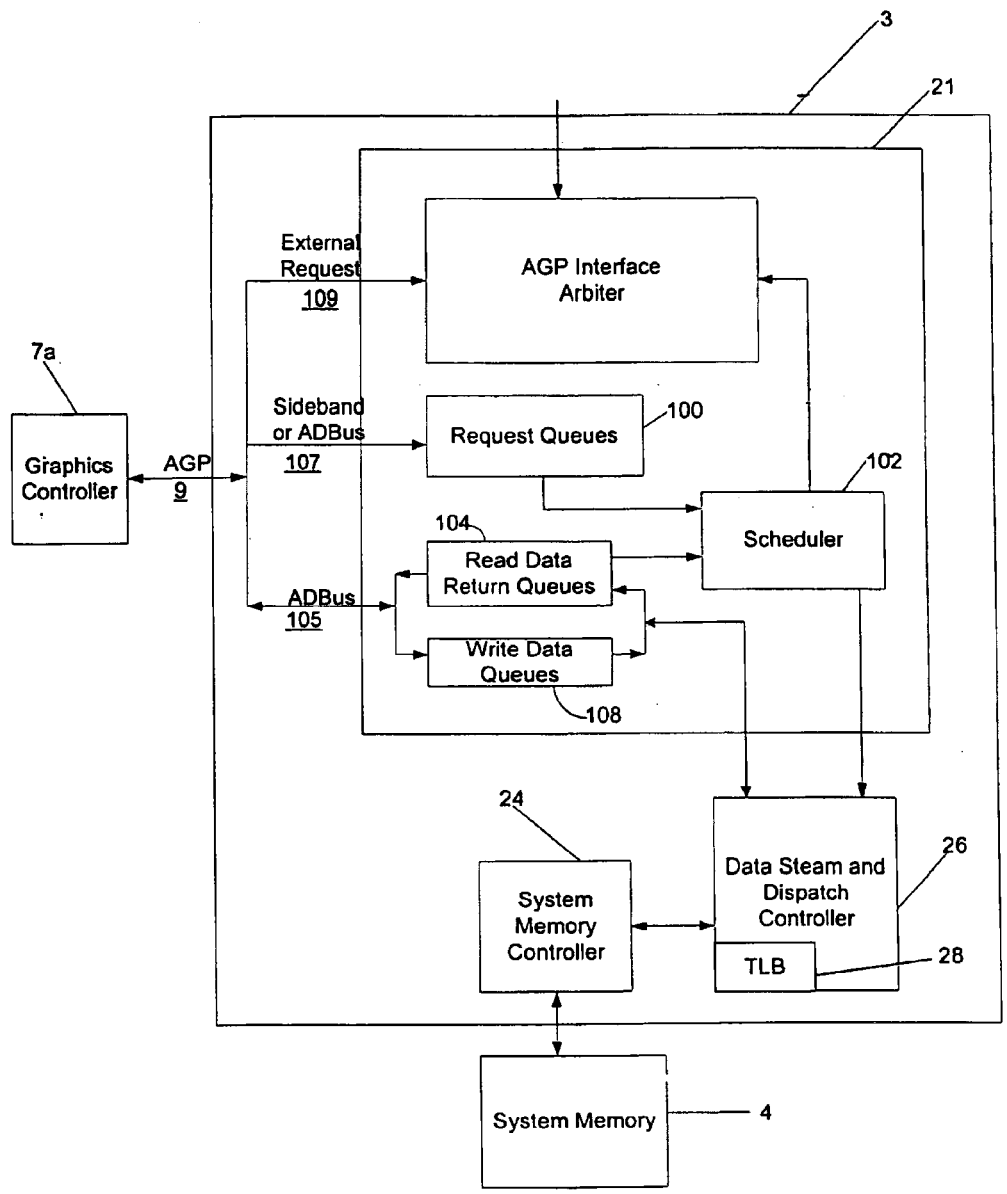
FIG. 3 is a schematic block diagram of accelerated graphics port (AGP) functionality of a graphics memory controller hub.

Referring to FIG. 3, AGP transactions are run in a split transaction fashion in which a request for data transfer to or from system memory 4 is disconnected in time from the data transfer itself. An AGP compliant graphics device (bus master) 7a initiates a transaction with an access request. The AGP interface 21 responds to the request by directing the corresponding data transfer at a later time, which permits the AGP graphics device 7a to pipeline several access requests while waiting for data transfers to occur. As a result of pipelining, several read and/or write access requests may be simultaneously outstanding in request queues 100. Access requests can either be pipelined across an address/data bus (AD bus) 105, 107 of AGP 9 or transferred through sideband address lines 107 of AGP 9 and received by request queue 100.

Scheduler 102 processes the access requests in request queue 100. Read data are obtained from system memory 4 and are returned at the initiative of scheduler 102 through read data return queue 104 and across AD bus 105 of the AGP 9. Write data are provided by AGP compliant graphics controller 7a at the direction of scheduler 102 when space is available in the write data queue 108. Thus, AGP transactions generally include interleaved access requests and data transfers.

Graphics data may be stored in system memory 4 when GMCH 3 operates in AGP mode in conjunction with an external AGP compliant graphics controller 7a, or when GMCH 3 operates in Gfx mode using its internal graphics functionality. When using system memory 4 to store graphics data, GMCH 3 uses a virtual memory addressing concept for accessing graphics data. In AGP mode, a 32 MB or 64 MB graphics aperture is defined through which addresses in the physical system memory 4 can be accessed by graphics controller 7a. The graphics aperture appears to graphics controller 7a as a 32 MB or 64 MB contiguous block of linear memory, although the addresses in physical system memory allocated for use by AGP graphics controller 7a are not contiguous. The contiguous block of memory addresses in the graphics aperture permits graphics controller 7a to quickly access large data structures, such as texture bitmaps (typically 1 KB to 128 KB), as single entities in virtual memory.

Access requests from graphics controller 7a address virtual memory within the aperture range, and then GMCH 3 forwards access requests within the aperture to physical system memory 4. The originally-issued addresses sent from graphics controller 7a are translated within data stream controller 26 using a Graphics Address Remapping Table (GART). The GART is a table that matches virtual memory address in the aperture range with corresponding physical memory addresses. The GART is stored in system memory in a location known to GMCH 3 because its location is stored in a register within GMCH 3. Addresses are mapped from the graphics aperture into system memory in 4 KB pages, and each entry of the GART translates one 4 KB page. Thus, when an access request is received from graphics controller 7a in the graphics aperture, the request is momentarily stalled while the appropriate GART entry is fetched from system memory 4. The address of the access request within the graphics aperture is translated using the fetched translation table entry, and the request is forwarded to the physical address in system memory 4 identified by the fetched GART entry.

To speed up memory access requests from AGP graphics controller 7a to system memory 4, GMCH 3 provides a GART entry cache 28 for locally storing up to four entries from the GART. GART entry cache 28 may also be known as a translation lookaside buffer (TLB). When a GART entry is first retrieved from the GART in system memory 4 to translate a virtual address into a physical address, the entry may be stored in the TLB 28 residing in data stream controller 26. The next time an address request from graphics controller 7a needs to use the same GART entry, the entry can be retrieved from the local TLB 28 rather than from the GART in distant system memory 4. Since GART entries may be stored in TLB 28 and each GART entry provides access to a 4 KB page of memory addresses, up to 16 KB of access requests from graphics controller 7a may be translated using the GART entries stored locally in TLB 28 before a new GART entry must be retrieved from system memory 4. If data stream controller 26 needs to use a GART entry that is not stored locally in TLB 28, the necessary entry may be retrieved from system memory 4 and then stored in TLB 28 for future use, thereby replacing an entry previously stored in TLB 28.

Referring again to FIG. 2, in Gfx mode, the internal graphics engines 27 of GMCH 3 define a 64 MB logical address space through which addresses in the physical system memory 4 or AIMM can be accessed by internal graphics engines 27. The logical address space appears to graphics controller 7a as a 32 MB or 64 MB contiguous block of linear memory, although the addresses in physical system memory 4 or AIMM allocated for use by internal graphics engines 27 are not contiguous. Like the graphics aperture used in AGP mode, the contiguous block of memory addresses in the logical address space permits internal graphics engines 27 to access large data structures quickly as single entities in virtual memory.

Access requests from internal graphics engines 27 are translated within data stream controller 26 using a Graphics Translation Table (GTT), which is stored in system memory in a location stored by GMCH 3 in a register within GMCH 3. Addresses within the logical address space are mapped into system memory or AIMM in 4 KB pages, and each entry of the GTT translates one 4 KB page. GTT entries additionally determine whether access requests are mapped to system memory 4 or AIMM memory, if an AIMM card is present. The same TLB 28 used in GMCH 3 to cache GART entries may be used to store up to four entries locally from the GTT in order to speed access to physical memory. Since the number of GART entries or GTT entries that may be stored in TLB 28 is limited by the physical die area size of the TLB, using the same TLB to store GART entries in AGP mode and to store GTT entries in Gfx mode effectively doubles the number of GART or GTT entries that may be stored in TLB compared to the number that could be stored if separate TLBs were used for GART and GTT entries. Additionally, using the same TLB to store GART entries in AGP mode and to store GTT entries in Gfx mode simplifies the internal logic of GMCH 3 because a single logic serves both functions of the TLB.

Other embodiments are within the scope of the following claims.

What is claimed is:

1. A memory controller hub comprising:
    an internal graphics subsystem adapted to perform graphics operations on data; and
    a cache adapted to store addresses of locations in physical memory available to the internal graphics subsystem for storing graphics data and adapted to store addresses of locations in physical memory available to an external graphics controller coupled to the memory controller hub for storing graphics data.

2. The memory controller hub of claim 1 further including a dedicated bus interface coupling the external graphics controller to the memory controller hub.

3. The memory controller hub of claim 2 wherein the dedicated bus interface includes an accelerated graphics port (AGP).

4. The memory controller hub of claim 1 configured to provide a block of linear, virtual memory addresses for use by the internal graphics subsystem, wherein the cache is adapted to store addresses of locations in physical memory that correspond to addresses within the block of linear, virtual memory addresses.

5. The memory controller hub of claim 1 configured to provide a block of linear, virtual memory addresses for use by the external graphics controller, wherein the cache is adapted to store addresses of locations in physical memory that correspond to addresses within the block of linear, virtual memory addresses.

6. The memory controller hub of claim 1 configured to provide a first block of linear, virtual memory addresses for use by the external graphics controller and adapted to provide a second block of linear, virtual memory addresses for use by the internal graphics subsystem, wherein the cache is adapted to store addresses of locations in physical memory that correspond to addresses within the first block of linear, virtual memory addresses and is adapted to store addresses of locations in physical memory that correspond to addresses within the second block of linear, virtual memory addresses.

7. A computer system comprising:
   a CPU;
   a display device;
   a system memory adapted to store video data and non-video data; and
   a memory controller hub coupled to the CPU and coupled to the system memory, the memory controller hub comprising:
      an internal graphics subsystem configured to perform graphics operations on graphics data; and
      a cache adapted to store addresses of locations in physical memory available to the internal graphics subsystem for storing graphics data and adapted to store addresses of locations in physical memory available to an external graphics controller coupled to the memory controller hub for storing graphics data.

8. The computer system of claim 7 further including a dedicated bus interface coupling the external graphics controller to the memory controller hub.

9. The computer system of claim 8 wherein the dedicated bus interface includes an accelerated graphics port (AGP).

10. The computer system of claim 7 wherein the memory controller hub is configured to provide a block of linear, virtual memory addresses for use by the internal graphics subsystem; and
   wherein the cache is adapted to store addresses of locations in physical memory that correspond to addresses within the block of linear, virtual memory addresses.

11. The computer system of claim 7 wherein the memory controller hub is configured to provide a block of linear, virtual memory addresses for use by the external graphics controller; and
   wherein the cache is adapted to store addresses of locations in physical memory that correspond to addresses within the block of linear, virtual memory addresses.

12. The computer system of claim 7 wherein the memory controller hub is configured to provide a first block of linear, virtual memory addresses for use by the external graphics controller and is adapted to provide a second block of linear, virtual memory addresses for use by the internal graphics subsystem; and
   wherein the cache is adapted to store addresses of locations in physical memory that correspond to addresses within the first block of linear, virtual memory addresses and is adapted to store addresses of locations in physical memory that correspond to addresses within the second block of linear, virtual memory addresses.

13. A method of storing addresses of locations in physical memory in a memory controller hub cache the method comprising:
   determining whether the memory controller hub is operably coupled to an external graphics controller or whether the memory controller hub performs graphics operations on data using an internal graphics subsystem; and
   if the memory controller hub is coupled to an external graphics controller, then storing in a cache within the memory controller hub addresses of locations in physical memory available to the external graphics controller for storing graphics data; but
   if the memory controller hub performs graphics operations on data using an internal graphics subsystem, then storing in the cache addresses of locations in physical memory available to the external graphics controller for storing graphics data.

14. The method of claim 13 further comprising:
   if the memory controller hub performs graphics operations on data using the internal graphics subsystem, providing a block of linear, virtual memory addresses in the memory controller hub for use by the internal graphics subsystem; and
   if the memory controller hub performs graphics operations on data using the internal graphics subsystem, storing in the cache addresses of locations in physical memory that correspond to addresses within the block of linear, virtual memory addresses.

15. The method of claim 13 further comprising:
   if the memory controller hub is coupled to an external graphics controller, providing a block of linear, virtual memory addresses in the memory controller hub for use by the external graphics controller; and
   if the memory controller hub is coupled to an external graphics controller, storing in the cache addresses of locations in physical memory that correspond to addresses within the block of linear, virtual memory addresses.

16. The method of claim 13 further comprising:
   if the memory controller hub performs graphics operations on data using the internal graphics subsystem, providing a block of linear, virtual memory addresses in the memory controller hub for use by the external graphics controller, and storing in the cache addresses of locations in physical memory that correspond to addresses within the block of linear, virtual memory addresses; or
   if the memory controller hub is coupled to an external graphics controller, providing a block of linear, virtual memory addresses in the memory controller hub for use by the internal graphics subsystem, and storing in the cache addresses of locations in physical memory that correspond to addresses within the block of linear, virtual memory addresses.

* * * * *